Feb. 27, 1951     R. J. OSBORN     2,543,254
HAND TRUCK AND PALLET CONSTRUCTION
Filed April 27, 1949
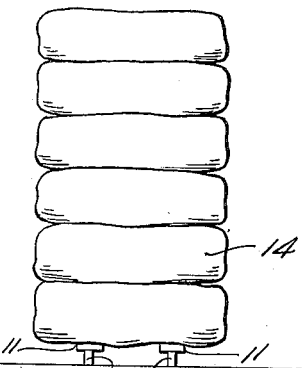
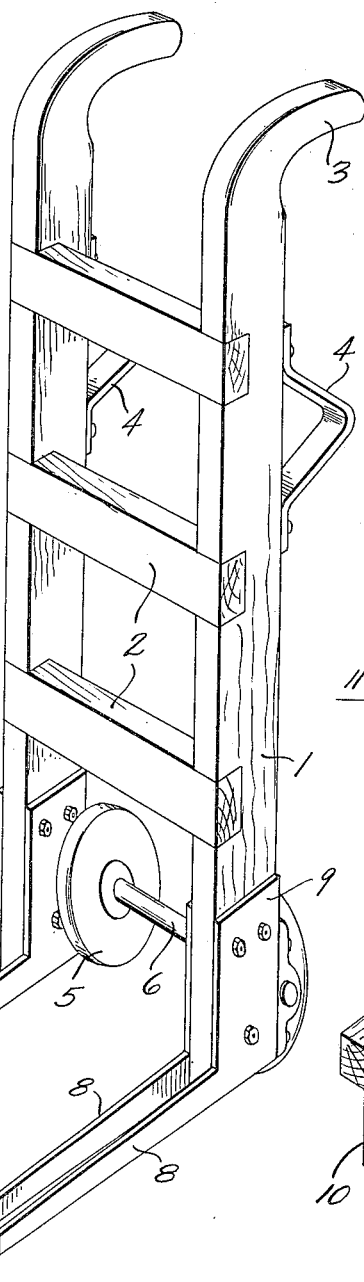
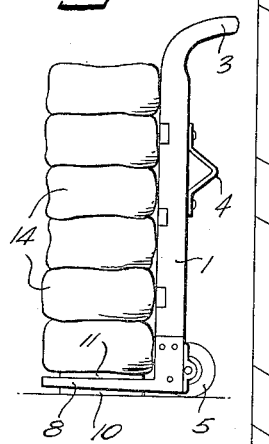
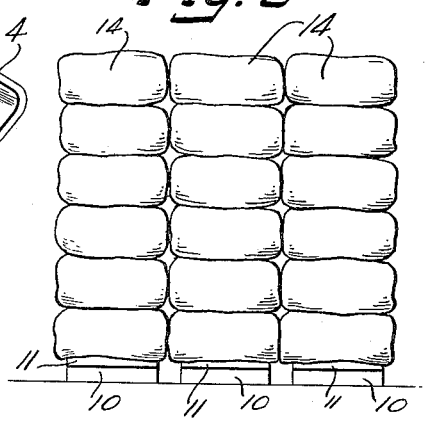
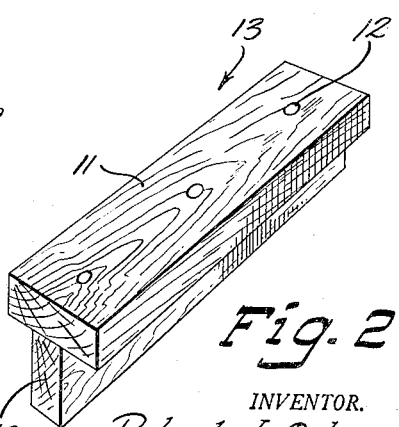
INVENTOR.
Robert J. Osborn
BY
Arthur R. Woolfolk
Attorney Patented Feb. 27, 1951

2,543,254

UNITED STATES PATENT OFFICE 2,543,254

HAND TRUCK AND PALLET CONSTRUCTION

Robert J. Osborn, Milwaukee, Wis.

Application April 27, 1949, Serial No. 89,894

3 Claims. (Cl. 214—65)

This invention relates to a hand truck and pallet construction and is particularly directed to a hand truck and pallet construction which is so made that it can be used to handle stacks of paper bags or other easily damaged packaged merchandise with assurance that no damage will come to the bags or other articles when they are handled by means of the truck and pallet construction.

It is the usual practice to ship and store sugar and other materials in paper bags and it has been found that when an ordinary hand truck is employed the chisel, or lower sharp bottom edge of the truck frequently damages and tears the bag when an attempt is made to insert such chisel below the lowermost bag. Further, it has been found that when these bags are stored on a cement floor, for instance, that the lowermost bag frequently deteriorates due to the absorption of moisture and thus becomes even weaker. Consequently, it is almost impossible to handle a stack of bags of sugar or other merchandise with an ordinary hand truck without destroying the lowermost bag of the stack.

This invention is designed to overcome the above noted defects and objects of this invention are to provide a combined truck and pallet construction which is so made that there is a direct coaction between the truck and the pallets, the truck serving to correctly space and position the pallets when the load is dumped or deposited on the floor for storage purposes, and to so organize and construct the apparatus that the truck may be quickly rolled or moved into place so that portions of the truck engage separate, independent and spaced pallets below the lowermost bag of the stack, thus permitting the operator to receive the entire stack of bags on the truck without any possible chance of damage to the lowermost bag of the stack.

Further specific objects of this invention are to provide a combined truck and pallet construction in which T-shaped, spaced pallets are provided which are expendable though not necessarily so, which are substantially indestructible and may be manufactured from scrap lumber or material with the utmost cheapness, and in which the truck is provided with two pairs of spaced prongs or fingers with the fingers spaced apart a distance slightly greater than the upright portion of the pallet and a lesser distance than the width of the transverse or top portion of the T-shaped pallets so that when the truck is tilted back, the prongs will engage the under side of the top portion of the pallets and will thus lift the stack of bags without any possible danger to the bottom bag, and in which the upright portions of the T-shaped pallets serve as guides for guiding the two pairs of spaced prongs of the truck into place, the truck in turn serving as the spacing member for correctly positioning the pallets initially.

Further objects are to provide a construction of truck and pallet in which the expense of making a hand truck is no greater than that of making an ordinary conventional type of hand truck and, as stated above, in which the pallets may be made with extreme cheapness and may be discarded, if desired, and to so organize and arrange the parts that the hand truck can be used in constricted places where power operated machines with elaborate pallet constructions could not be used.

An embodiment of the invention is shown in the accompanying drawings, in which:

Figure 1 is a perspective view of the hand truck without the pallets.

Figure 2 is a perspective view showing one of the pallets.

Figure 3 shows the manner in which the pallets cooperate with the hand truck and form a construction which permits the stacking and ready handling of a plurality of bags.

Figure 4 is a front view of a stack of bags with the pallets in place.

Figure 5 shows how a plurality of stacks of bags can be placed with the bags of successive stacks in contact with each other, thus saving space.

Referring to the drawings, it will be seen that a hand truck has been provided and is equipped with uprights 1 and transverse members 2. It may have the usual handles 3, feet 4, and wheels 5. The wheels are carried by a suitable transverse axle 6. The truck is provided with two pairs of spaced prongs indicated generally by the reference characters 7, 7. These pairs of prongs consist of outwardly extending tongues or fingers, or prong-like members 8 which are substantially horizontal when the uprights 1 of the truck are vertical and which preferably taper outwardly towards their outer ends. The prongs 8 are formed integrally with members 9 which are bolted or otherwise rigidly secured to the uprights 1 of the truck.

The pallets consist of T-shaped members which are made from scrap lumber or other material and are provided with vertical portions or supporting portions 10 and with transverse or horizontal upper portions 11 secured to the vertical portions in any suitable manner as by means of a series of nails 12. The thickness of the vertical portions 10 of the pallets is less than the spacing between the prongs 8 of the truck and these vertical portions 10 of the pallets serve as guiding means for guiding the prongs into place when the truck is moved into the position shown in Figure 3.

In using the apparatus, the pallets indicated generally by the reference character 13 are positioned on the prongs 8 with the vertical portions 10 of the pallets between the prongs. The truck thus serves as the spacing means for correctly spacing the separate pallets and coacts with the pallets to always secure their correct spacing. The paper bags 14 of sugar or other mechandise are placed on the pallets after the pallets have been positioned on the prongs with the vertical portion therebetween as described hereinabove, and the bags are stacked to the requisite height, for instance as shown in Figure 3. The positioning of the pallets is such that they occupy approximately the spacing and relative position with respect to the bags as shown in Figure 4 and thus the load is evenly distributed upon the pallets. The spacing of the prongs 8 is such that even if the pallets tilt a slight amount, nevertheless their vertical portions are freely receivable between the adjacent prongs of each pair.

When a suitable load has been stacked on the truck, the truck is tilted rearwardly and the prongs engage the under side of the horizontal portion of the pallets and thus lifts the load of bags without damage to the bottom bag. The truck is readily rolled to the desired position and the stack of bags with the pallets in place are deposited as shown in Figure 4. Subsequent loads of bags with the pallets in place may be stacked with the bags in contact with each other as shown in Figure 5. The pallets are made slightly shorter than the width of the bag so as to allow the bags to be stacked with the bags in contact with each other as described. In this way space is conserved without any possible hindrance to the free trucking or handling of the stacks of bags and without any possible damage to the lowermost of the bags. It is to be understood that the bottom surface of the vertical portions 10 of the pallets is flat so that the pallets will stand in their correctly positioned manner upon the floor when the load is placed on them.

It will be seen that the truck and pallet construction provides for the cheap, simple and easy handling of stacks of bags; that the utmost protection is afforded to the bags even though the bags are made of paper or other fragile material and that the merchandise is stored in spaced relation to the floor, thereby preventing moisture from damaging the lowermost bag and its contained merchandise.

It is to be noted particularly that the pallets are not constructed with connecting members which would complicate their manufacture, interfere with their handling, necessitate careful storing of the pallets themselves when not in use, and which would otherwise complicate the structure. Instead the pallets are constructed with the utmost simplicity and are so made that scrap lumber or scrap wood may be easily employed. The pallets, therefore, are so cheap that they may be dispensed with after use if so desired or may be readily stored or stacked. They can be handled very roughly without any danger to the pallets which would not be true if elaborate, connected pallet constructions were employed. Instead the correct spacing of the pallets is secured by the coaction of the truck itself and the truck is so made that the prongs are guided by the upright portion of the pallets and are positioned below the transverse upper portion of the pallets and will thus lift a stack of bags without any possible damage to even the lowermost bag.

Although this invention has been described in considerable detail, it is to be understood that such description is intended as illustrative rather than limiting, as the invention may be variously embodied and is to be interpreted as claimed.

I claim:

1. A truck and pallet construction comprising a truck having two pairs of outwardly projecting spaced prongs, and a pair of T-shaped pallets each having vertical portions arranged to be positioned between the prongs of said truck and having transverse top portions adapted to support a load, the pairs of prongs of the truck being arranged to engage the under sides of the top portions of said pallets to lift the load, said pallets being wholly detached from each other and being correctly spaced solely by the pairs of prongs of said truck.

2. A hand truck and pallet construction comprising a truck having a pair of uprights and handles projecting from adjacent the upper ends thereof and having supporting wheels adjacent the lower ends of said uprights, said truck having outwardly projecting pairs of spaced prongs adjacent the lower ends of said uprights, and a pair of T-shaped pallets having vertical portions and horizontal top portions, the vertical portions of said pallets being arranged for reception between the prongs of said truck, the prongs of each pair being spaced apart a distance slightly greater than the thickness of the vertical portion of said pallets and being arranged to be positioned below the top portions of said pallets and arranged to engage the under side of the top portion of said pallets when said truck is tilted backwardly to thereby lift the said pallets, and said pallets being wholly detached from each other and being correctly spaced solely by the pairs of prongs of said truck.

3. A hand truck and pallet construction comprising a truck having a pair of uprights and handles projecting from adjacent the upper ends thereof and having supporting wheels adjacent the lower ends of said uprights, said truck having outwardly projecting pairs of spaced prongs adjacent the lower ends of said uprights, and a pair of T-shaped pallets having vertical portions and horizontal top portions, the vertical portions of said pallets being arranged for reception between the prongs of said truck, the prongs of each pair being spaced apart a distance slightly greater than the thickness of the vertical portion of said pallets and being arranged to be positioned below the top portions of said pallets and arranged to engage the under side of the top portion of said pallets when said truck is tilted backwardly to thereby lift the said pallets, said pallets having flat bottom portions arranged to rest upon a floor to thereby support a load positioned upon said pallets out of contact with the floor, and said pallets being wholly detached from each other and being correctly spaced solely by the pairs of prongs of said truck.

ROBERT J. OSBORN.

REFERENCES CITED

The following references are of record in the file of this patent:

UNITED STATES PATENTS

| Number | Name | Date |
| --- | --- | --- |
| 1,121,982 | Crum | Dec. 22, 1914 |
| 1,799,307 | Manley | Apr. 7, 1931 |
| 2,239,135 | Wehr | Apr. 22, 1941 |
| 2,412,184 | Ulinski | Dec. 3, 1946 |

FOREIGN PATENTS

| Number | Country | Date |
| --- | --- | --- |
| 540,618 | France | Apr. 20, 1922 |